(12) United States Patent
Shi et al.

(10) Patent No.: US 11,277,766 B2
(45) Date of Patent: Mar. 15, 2022

(54) DATA INDICATION METHOD AND APPARATUS AND COMMUNICATION SYSTEM

(71) Applicant: FUJITSU LIMITED, Kawasaki (JP)

(72) Inventors: Yulong Shi, Beijing (CN); Pengyu Ji, Beijing (CN); Hua Zhou, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/676,747

(22) Filed: Nov. 7, 2019

(65) Prior Publication Data

US 2020/0077295 A1 Mar. 5, 2020

Related U.S. Application Data

(63) Continuation of application No. 16/505,083, filed on Jul. 8, 2019, now Pat. No. 10,542,455, which is a continuation of application No. PCT/CN2017/103702, filed on Sep. 27, 2017.

(51) Int. Cl.
*H04W 28/02* (2009.01)
*H04W 28/06* (2009.01)
*H04W 80/02* (2009.01)

(52) U.S. Cl.
CPC ... *H04W 28/0278* (2013.01); *H04W 28/0252* (2013.01); *H04W 28/06* (2013.01); *H04W 80/02* (2013.01)

(58) Field of Classification Search
CPC .................................................. H04W 72/12
See application file for complete search history.

(56) References Cited

U.S. PATENT DOCUMENTS

| 2009/0257390 A1 | 10/2009 | Ji et al. |
| 2013/0016615 A1 | 1/2013 | Shi et al. |
| 2015/0334739 A1 | 11/2015 | Yan et al. |

(Continued)

FOREIGN PATENT DOCUMENTS

| CN | 101547435 A | 9/2009 |
| CN | 102007808 A | 4/2011 |
| CN | 104081745 A | 10/2014 |

(Continued)

OTHER PUBLICATIONS

Sony, "Discussion on SS block time index indication" 3GPP TSG RAN WGl Meeting #89, Agenda Item 7.1.1.1.3, RI-1708253, Hangzhou, P.R. China, May 15-19, 2017 (Cited in the International Search Report issued for the PCT application No. PCT/CN2017/088471 dated Mar. 15, 2018).

(Continued)

*Primary Examiner* — Sulaiman Nooristany
(74) *Attorney, Agent, or Firm* — Myers Wolin, LLC

(57) ABSTRACT

A terminal, including: a memory that stores a plurality of instructions; and a processor coupled to the memory and configured to execute the instructions to: multiplex logical channel data of a logical channel group (LCG); and a transmitter configured to transmit a buffer status report (BSR) of a variable length to a network side, wherein the BSR of a variable length contains a first buffer size of the LCG after the logical channel data of the LCG are multiplexed, and the LCG has a second buffer size being greater than zero before the logical channel data of the LCG are multiplexed.

2 Claims, 6 Drawing Sheets

801 a buffer status report of a variable length is transmitted to a network side; wherein, the buffer status report of a variable length contains buffer size information on a logical channel group with a buffer size being greater than zero when the buffer status report is triggered or before logical channel data are multiplexed, or contains buffer size information on a logical channel group with a buffer size being greater than zero before logical channel data are multiplexed and being equal to zero after the logical channel data are multiplexed

(56) References Cited

U.S. PATENT DOCUMENTS

2018/0270699 A1* 9/2018 Babaei .............. H04W 72/1284
2018/0279150 A1* 9/2018 He .................... H04W 72/1284

FOREIGN PATENT DOCUMENTS

| CN | 106535246 A | 3/2017 |
| CN | 106714078 A | 5/2017 |
| CN | 106793059 A | 5/2017 |
| EP | 3051736 A1 | 8/2016 |

OTHER PUBLICATIONS

Huawei, HiSilicon "Soft-combining for PBCH" 3GPP TSG RAN WGI Meeting #89, Agenda Item: 7.1.4.3, RI-1708158, Hangzhou, China, May 15-19, 2017 (Cited in the International Search Report issued for the PCT application No. PCT/CN2017/088471 dated Mar. 15, 2018).

International Search Report issued for corresponding International Patent Application No. PCT/CN2017/088471, dated Mar. 15, 2018 with English translation attached.

International Search Report issued by the State Intellectual Property Office of the P.R. China for corresponding International Patent Application No. PCT/CN2017/103702, dated Nov. 24, 2017, with an English translation.

Written Opinion of the International Searching Authority issued by the State Intellectual Property Office of the P.R. China for corresponding International Patent Application No. PCT/CN2017/103702, dated Nov. 24, 2017, with an English translation.

Notice of Allowance issued by the USPTO dated Sep. 20, 2019 for corresponding U.S. Appl. No. 16/505,083.

Notice of Allowance issued by the USPTO dated Oct. 16, 2019 for corresponding U.S. Appl. No. 16/505,083.

Examination Report issued by the Patent Office of India for corresponding Indian Patent Application No. 201937050345, dated Mar. 4, 2021, with an English translation.

Notice of Reasons for Refusal issued by the Japan Patent Office for corresponding Japanese Patent Application No. 2019-566941, dated Dec. 8, 2020, with an English translation.

Vice-Chairwoman (INTERDIGITAL), "Report from NR UP and LTE Break-Out Session (FeD2D, sTTI, Rel-14 corrections)". Agenda Item: 13.1.2, 3GPP TSG-RAN WG2 Meeting #98, R2-1704030, Hangzhou, China, May 15-19, 2017.

Huawei, Change Request for "Clarification on Logical Channel Group Id for NB-IoT", 3GPP TSG-RAN WG2 Meeting #97, R2-1701418, Athens, Greece, Feb. 13-17, 2017.

Extended European search report with supplementary European search report and the European search opinion issued by the European Patent Office for corresponding European Patent Application No. 17 91 3162.8-1215, dated Feb. 1, 2021.

Notice of Preliminary Rejection issued by the Korean Intellectual Property Office for corresponding Korean Patent Application No. 10-2019-7031653, dated Dec. 14, 2020, with an English translation.

Huawei, et al., "BSR Format", Agenda Item: 10.3.1.5, 3GPP TSG-RAN WG2 #97bis, R2-1702604, Spokane, USA, Apr. 3-7, 2017.

Huawei, Change Request for "Clarification on Logical Channel Group Id for NB-IoT", 3GPP TSG-RAN WG2 Meeting #97, R2-1701417, Athens, Greece, Feb. 13-17, 2017.

* cited by examiner 101
a buffer status report is transmitted to a network side, the buffer status report containing at least one piece of buffer size information, the buffer size information indicating a buffer size to which a logical channel or a logical channel group corresponds
FIG. 1
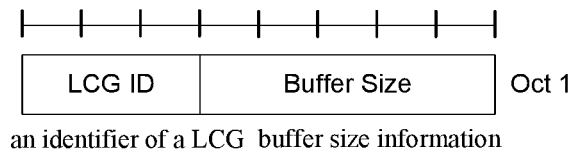
an identifier of a LCG   buffer size information
FIG. 2
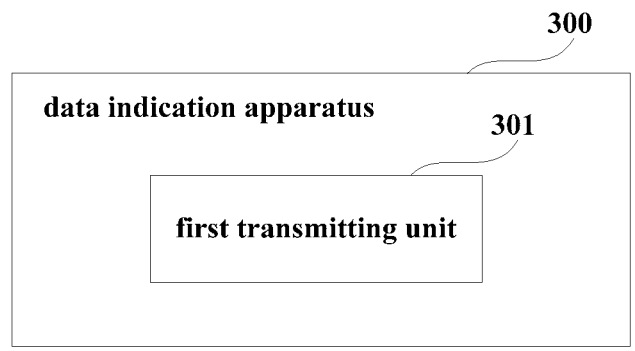
FIG. 3

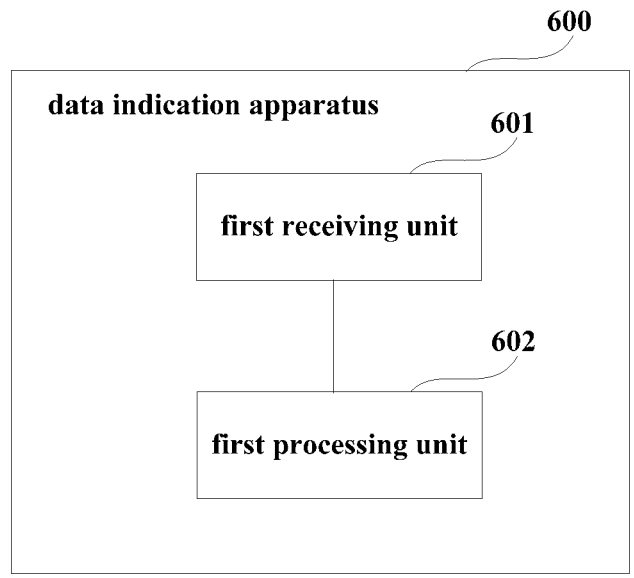

FIG.6

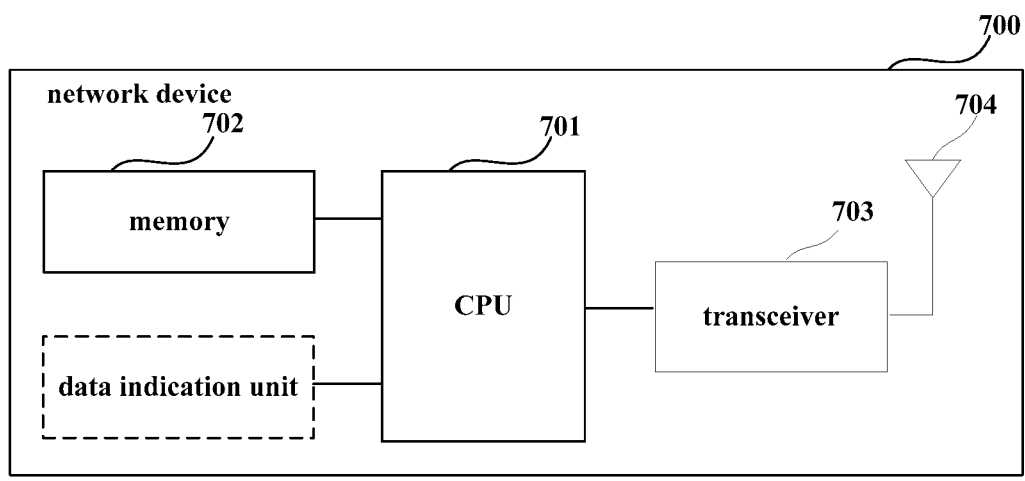

FIG.7 a buffer status report of a variable length is transmitted to a network side; wherein, the buffer status report of a variable length contains buffer size information on a logical channel group with a buffer size being greater than zero when the buffer status report is triggered or before logical channel data are multiplexed, or contains buffer size information on a logical channel group with a buffer size being greater than zero before logical channel data are multiplexed and being equal to zero after the logical channel data are multiplexed

FIG.8

DATA INDICATION METHOD AND APPARATUS AND COMMUNICATION SYSTEM

CROSS REFERENCE TO RELATED APPLICATIONS

This application is a continuation of U.S. application Ser. No. 16/505,083, filed on Jul. 8, 2019, which claims the benefit of International Application PCT/CN2017/103702, filed on Sep. 27, 2017, which claims foreign priority to PCT/CN2017/088471, filed on Jun. 15, 2017, the entire contents of each are incorporated herein by reference.

FIELD

This disclosure relates to the field of communication technologies, and in particular to a data indication method and apparatus and a communication system.

BACKGROUND

In a long term evolution (LTE) system, resources for transmitting uplink data are obtained according to a buffer status report (BSR), which is used to provide to a serving base station how many data does a user equipment (UE) has that need to be transmitted.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

In an LTE system, a BSR has two data formats, namely, a short BSR and a long BSR. In the short BSR format, a field of 2 bits is needed to indicate a logical channel group identification (LCG ID) to which the buffer status corresponds, and a buffer size field is also needed to specifically indicate a value range of the buffer size in the logical channel group; and a value of the LCG ID is not included in the long BSR format, but value ranges of buffer sizes of all logical channel groups are included.

In a future wireless communication system, such as a 5G or new radio (NR) system, a buffer status report (BSR) needs to at least include two formats. One is a short buffer status report (a short BSR), and the other is a buffer status report of a variable length (a variable BSR).

Considering that the number of logical channel groups will increase in the future communication system, original LCG ID fields need to be increased correspondingly. In this way, data formats of the buffer status report are unable to satisfy a byte alignment rule, and their buffer size fields are unable to be denoted by using 6 bits in the LTE system any longer.

Furthermore, due to the introduction of the BSR format of a variable length, a result of multiplexing MAC layer logical channel data may affect a length of the BSR (a logical channel group of a buffer status being empty after data multiplexing needs not to report a buffer status), thereby affecting currently available physical resource sizes, and logical channel data multiplexing needs to be further adjusted, which may possibly affect the length of the BSR again. Such an operation will result in increase of complexity of processing at a transmitter end, thereby increasing processing delay.

Embodiments of this disclosure provide a data indication method and apparatus and a communication system, in which by containing at least one piece of buffer size information in a buffer status report, a data format of a short BSR is enabled to meet a byte alignment rule.

Embodiments of this disclosure provide a data indication method and apparatus and a communication system, in which by containing buffer size information on a logical channel group with a buffer size being greater than zero before logical channel data are multiplexed, complexity of processing of a transmitter end may be lowered, thereby lowering processing delay.

According to a first aspect of the embodiments of this disclosure, there is provided a data indication apparatus, including: a first transmitting unit configured to transmit a buffer status report to a network side, the buffer status report containing at least one piece of buffer size information, the buffer size information indicating a buffer size to which a logical channel or a logical channel group corresponds.

According to a second aspect of the embodiments of this disclosure, there is provided a data indication apparatus, including:

a first receiving unit configured to receive a buffer status report transmitted by a UE, the buffer status report containing at least one piece of buffer size information, the buffer size information indicating a buffer size to which a logical channel or a logical channel group corresponds.

According to a third aspect of the embodiments of this disclosure, there is provided a data indication apparatus, including:

a second transmitting unit configured to transmit a buffer status report of a variable length to a network side; wherein, the buffer status report of a variable length contains buffer size information on a logical channel group with a buffer size being greater than zero when the buffer status report is triggered or before logical channel data are multiplexed, or contains buffer size information on a logical channel group with a buffer size being greater than zero before logical channel data are multiplexed and being equal to zero after the logical channel data are multiplexed.

According to a fourth aspect of the embodiments of this disclosure, there is provided a data indication apparatus, including:

a second receiving unit configured to receive a buffer status report of a variable length transmitted by a UE; wherein, the buffer status report of a variable length contains buffer size information on a logical channel group with a buffer size being greater than zero when the buffer status report is triggered or before logical channel data are multiplexed, or contains buffer size information on a logical channel group with a buffer size being greater than zero before logical channel data are multiplexed and being equal to zero after the logical channel data are multiplexed.

According to a fifth aspect of the embodiments of this disclosure, there is provided a communication system, including a UE and a network device; wherein, the UE transmits a buffer status report to the network device, the buffer status report containing at least one piece of buffer size information, the buffer size information indicating a buffer size to which a logical channel or a logical channel group corresponds, and the network device receives the buffer status report.

According to a sixth aspect of the embodiments of this disclosure, there is provided a communication system, including a UE and a network device; wherein, the UE transmits a buffer status report of a variable length to the network device; wherein, the buffer status report of a variable length contains buffer size information on a logical channel group with a buffer size being greater than zero when the buffer status report is triggered or before logical channel data are multiplexed, or contains buffer size information on a logical channel group with a buffer size being greater than zero before logical channel data are multiplexed and being equal to zero after the logical channel data are multiplexed, and the network device receives the buffer status report of a variable length.

An advantage of the embodiments of this disclosure exists in that by containing at least one piece of buffer size information in a buffer status report, a data format of a short BSR is enabled to meet a byte alignment rule, and by containing buffer size information on a logical channel group with a buffer size being greater than zero before logical channel data are multiplexed, complexity of processing of a transmitter end may be lowered, thereby lowering processing delay.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising/includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

Elements and features depicted in one drawing or embodiment of the disclosure may be combined with elements and features depicted in one or more additional drawings or embodiments. Moreover, in the drawings, like reference numerals assign corresponding parts throughout the several views and may be used to assign like or similar parts in more than one embodiment.

The drawings are included to provide further understanding of this disclosure, which constitute a part of the specification and illustrate the preferred embodiments of this disclosure, and are used for setting forth the principles of this disclosure together with the description. It is obvious that the accompanying drawings in the following description are some embodiments of this disclosure, and for those of ordinary skills in the art, other accompanying drawings may be obtained according to these accompanying drawings without making an inventive effort.

In the drawings:

FIG. 1 is a flowchart of the data indication method of Embodiment 1;

FIG. 2 is a schematic diagram of a format of a buffer status report of Embodiment 1;

FIG. 3 is a schematic diagram of a structure of the data indication apparatus of Embodiment 2;

FIG. 4 is a schematic diagram of a structure of the UE of Embodiment 2;

FIG. 5 is a flowchart of the data indication method of Embodiment 3;

FIG. 6 is a schematic diagram of a structure of the data indication apparatus of Embodiment 4;

FIG. 7 is a schematic diagram of a structure of the network device of Embodiment 4;

FIG. 8 is a flowchart of the data indication method of Embodiment 5;

FIG. 9 is a schematic diagram of a structure of the data indication apparatus of Embodiment 6;

FIG. 10 is a schematic diagram of a structure of the UE of Embodiment 6;

FIG. 11 is a flowchart of the data indication method of Embodiment 7;

Figure 12:
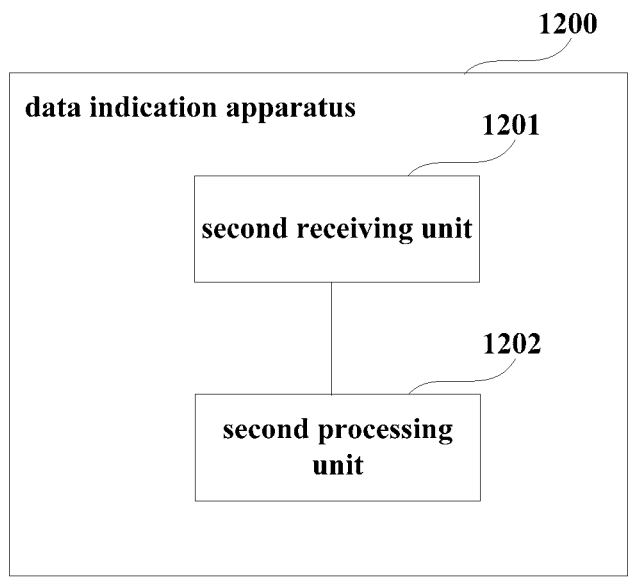
Figure 13:
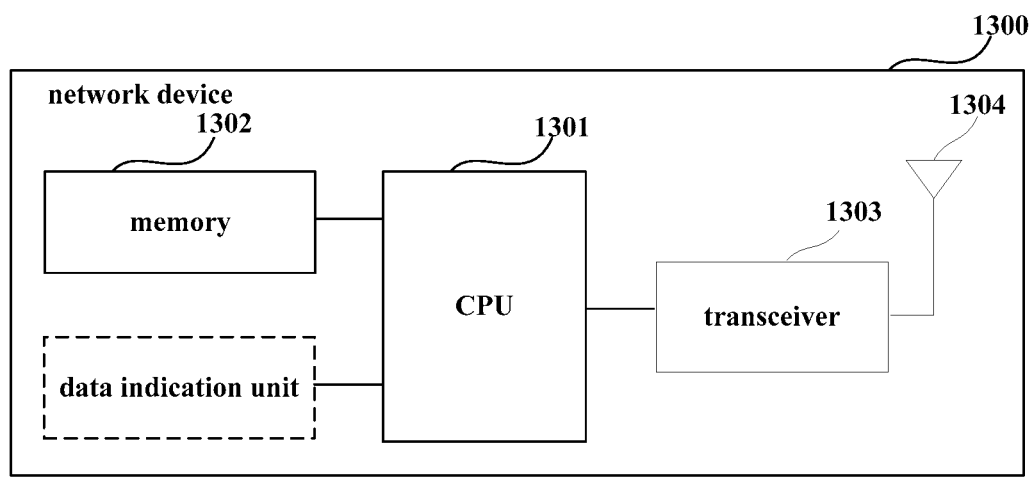
Figure 14:
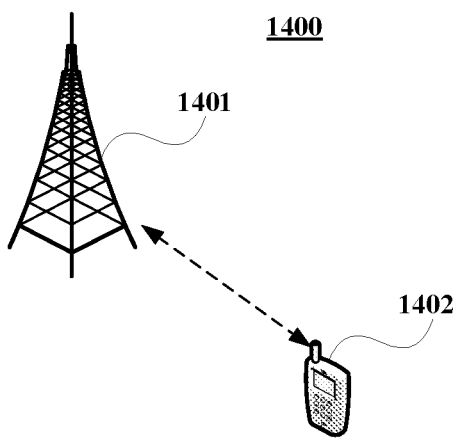

FIG. 12 is a schematic diagram of a structure of the data indication apparatus of Embodiment 8;

FIG. 13 is a schematic diagram of a structure of the network device of Embodiment 8; and FIG. 14 is a schematic diagram of the communication system of Embodiment 9.

DETAILED DESCRIPTION

These and further aspects and features of the present disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims. Various implementations of the embodiments of this disclosure shall be described with reference to the accompanying drawings. These implementations are illustrative only, and are not intended to limit this disclosure.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

In the embodiments of this disclosure, the term "communication network" or "wireless communication network" may refer to a network satisfying any one of the following communication standards: long term evolution (LTE), long term evolution-advanced (LTE-A), wideband code division multiple access (WCDMA), and high-speed packet access (HSPA), etc.

And communication between devices in a communication system may be performed according to communication protocols at any stage, which may, for example, include but not limited to the following communication protocols: 1G (generation), 2G 2.5G 2.75G 3G 4G 4.5G and 5G and new radio (NR) in the future, etc., and/or other communication protocols that are currently known or will be developed in the future.

In the embodiments of this disclosure, the term "network device", for example, refers to a device in a communication system that accesses a terminal device to the communication network and provides services for the terminal device. The network device may include but not limited to the following devices: a base station (BS), an access point (AP), a transmission reception point (TRP), a broadcast transmitter, a mobile management entity (MME), a gateway, a server, a radio network controller (RNC), a base station controller (BSC), etc.

For example, the base station includes but not limited to a node B (NodeB or NB), an evolved node B (eNodeB or eNB), and a 5G base station (gNB), etc. Furthermore, it may include a remote radio head (RRH), a remote radio unit (RRU), a relay, or a low-power node (such as a femto, and a pico). The term "base station" may include some or all of its functions, and each base station may provide communication coverage for a specific geographical area. And a term "cell" may refer to a base station and/or its coverage area, which is dependent on a context of the term.

In the embodiments of this disclosure, the term "user equipment (UE)" or "terminal equipment (TE)" refers to, for example, equipment accessing to a communication network and receiving network services via a network device. The user equipment may be fixed or mobile, and may also be referred to as a mobile station (MS), a terminal, a subscriber station (SS), an access terminal (AT), or a station, etc.

For example, the user equipment may include but not limited to the following devices: a cellular phone, a personal digital assistant (PDA), a wireless modem, a wireless communication device, a hand-held device, a machine-type communication device, a lap-top, a cordless telephone, a smart cell phone, a smart watch, and a digital camera, etc.

For another example, in a scenario of the Internet of Things (IoT), etc., the user equipment may also be a machine or a device performing monitoring or measurement. For example, it may include but not limited to a machine-type communication (MTC) terminal, a vehicle mounted communication terminal, a device to device (D2D) terminal, and a machine to machine (M2M) terminal, etc.

The embodiments of this disclosure shall be described below with reference to the accompanying drawings.

Embodiment 1

Embodiment 1 provides a data indication method. FIG. 1 is a flowchart of the data indication method of Embodiment 1. As shown in FIG. 1, the method includes:

block 101: a buffer status report is transmitted to a network side, the buffer status report containing at least one piece of buffer size information, the buffer size information indicating a buffer size to which a logical channel or a logical channel group corresponds.

In an embodiment, when a medium access control layer protocol data unit (MAC PDU) is constructed, the buffer status report may be encapsulated in a control element of the MAC PDU and transmitted to the network side; wherein, the MAC PDU is constituted by an 8-bit integer multiple bit string.

In an embodiment, the buffer status report carries BSR information of one or more logical channel groups (LCGs); wherein, the buffer status report is denoted by using a first predetermined number N of bytes, each byte corresponding to 8 bits, a format of the buffer status report being a short buffer status report.

In an embodiment, as the logical channel or the logical channel group to which the buffer size indicated by the buffer size information contained in the buffer status report corresponds needs to be determined, the buffer status report further includes an identifier of the logical channel or the logical channel group.

In an embodiment, the identifier of the logical channel or logical channel group is a second predetermined X number of bit fields, and the buffer size information to which the logical channel or logical channel group corresponds is a third predetermined number Y of bit fields.

In an embodiment, each value of the second predetermined number of bit fields corresponds to an identifier of a logical channel or a logical channel group, and the second predetermined number may be determined according to the number of logical channels or logical channel groups. For example, when the number of logical channel groups is 5-8, the second predetermined number is 3. For example, "000" denotes that the identifier of the logical channel or logical channel group is 0, "001" denotes that the identifier of the logical channel or logical channel group is 1, "010" denotes that the identifier of the logical channel or logical channel group is 2, . . . , and so on. What described above is illustrative only, and the second predetermined number may also be other values.

In an embodiment, in order to satisfy the byte alignment rule, a sum of the second predetermined number and the third predetermined number is equal to an integer multiple of 8 bits, hence, the third predetermined number may be determined according to the second predetermined number, so as to ensure that a length of a data format of the short BSR is an integer multiple of 8 bits.

For example, the buffer size information is a field with the third predetermined number Y being 5 bits, or a field smaller than 5 bits, or a field larger than 6 bits; wherein, each value of the field corresponds to a range of values of a buffer size.

For example, the format of the buffer status report may be N bytes, and when the identifier of the logical channel group is denoted by a field of X bits, the buffer size information is a field of Y bits; where, $8N=X+Y$, $N$, $X$ and $Y$ being positive integers greater than 1.

For example, when $N=1$ and $X=3$, $Y=5$, and when $N=2$ and $X=6$, $Y=10$, which shall not be enumerated herein any further.

Following description shall be given to the range of values of the buffer size to which each value corresponds by taking $Y=5$ as an example only; however, the embodiment is not limited thereto.

In an embodiment, since the buffer size information is a field of 5 bits, the number of its values is 32, and each value corresponds to a range of values of a buffer size.

In one implementation, a maximum buffer that may be denoted by the buffer size information is 150 k bytes, and the range of values of the buffer size to which each value corresponds is as shown in Table 1 below:

TABLE 1

| Index | Buffer Size (BS) value [bytes] |
|---|---|
| 0 | BS = 0 |
| 1 | 0 < BS <= 10 |
| 2 | 10 < BS <= 14 |
| 3 | 14 < BS <= 20 |
| 4 | 20 < BS <= 28 |
| 5 | 28 < BS <= 38 |
| 6 | 38 < BS <= 53 |
| 7 | 53 < BS <= 74 |
| 8 | 74 < BS <= 102 |
| 9 | 102 < BS <= 142 |
| 10 | 142 < BS <= 198 |
| 11 | 198 < BS <= 276 |
| 12 | 276 < BS <= 384 |
| 13 | 384 < BS <= 535 |
| 14 | 535 < BS <= 745 |
| 15 | 745 < BS <= 1038 |
| 16 | 1038 < BS <= 1446 |
| 17 | 1446 < BS <= 2014 |
| 18 | 2014 < BS <= 2806 |
| 19 | 2806 < BS <= 3909 |
| 20 | 3909 < BS <= 5446 |
| 21 | 5446 < BS <= 7587 |
| 22 | 7587 < BS <= 10570 |
| 23 | 10570 < BS <= 14726 |
| 24 | 14726 < BS <= 20516 |
| 25 | 20526 < BS <= 28581 |
| 26 | 28581 < BS <= 39818 |
| 27 | 39818 < BS <= 55474 |
| 28 | 55474 < BS <= 77284 |
| 29 | 77284 < BS <= 107669 |
| 30 | 107669 < BS <= 150000 |
| 31 | BS > 150000 |

In one implementation, a maximum buffer that may be denoted by the buffer size information is 3000 k bytes, and the range of values of the buffer size to which each value corresponds is as shown in Table 2 below:

TABLE 2

| Index | Buffer Size (BS) value [bytes] |
|---|---|
| 0 | BS = 0 |
| 1 | 0 < BS <= 10 |
| 2 | 10 < BS <= 16 |
| 3 | 16 < BS <= 24 |
| 4 | 24 < BS <= 37 |
| 5 | 37 < BS <= 57 |
| 6 | 57 < BS <= 88 |
| 7 | 88 < BS <= 136 |
| 8 | 136 < BS <= 210 |
| 9 | 210 < BS <= 325 |
| 10 | 325 < BS <= 501 |
| 11 | 501 < BS <= 774 |
| 12 | 774 < BS <= 1196 |
| 13 | 1196 < BS <= 1847 |
| 14 | 1847 < BS <= 2853 |
| 15 | 2853 < BS <= 4407 |
| 16 | 4407 < BS <= 6808 |
| 17 | 6808 < BS <= 10517 |
| 18 | 10517 < BS <= 16246 |
| 19 | 16246 < BS <= 25096 |
| 20 | 25096 < BS <= 38767 |
| 21 | 38767 < BS <= 59886 |
| 22 | 59886 < BS <= 92511 |
| 23 | 92511 < BS <= 142909 |
| 24 | 142909 < BS <= 220762 |
| 25 | 220762 < BS <= 341028 |
| 26 | 341028 < BS <= 526813 |
| 27 | 526813 < BS <= 813810 |
| 28 | 813810 < BS <= 1257155 |
| 29 | 1257155 < BS <= 1942026 |
| 30 | 1942026 < BS <= 3000000 |
| 31 | BS > 3000000 |

Hence, in a future communication system, the byte alignment rule may be satisfied, and it may be ensured that a length the data format of the short BSR is an integer multiple of 8 bits.

Embodiment 2

Embodiment 2 provides a data indication apparatus. As a principle of the apparatus for solving problems is similar to that of the method in Embodiment 1, reference may be made to the implementation of the method in Embodiment 1 for implementation of the apparatus, with identical contents being not going to be described herein any further.

FIG. 3 is a schematic diagram of the data indication apparatus, which is applicable to a UE side. As shown in FIG. 3, a data indication apparatus 300 includes:

a first transmitting unit 301 configured to transmit a buffer status report to a network side, the buffer status report containing at least one piece of buffer size information, the buffer size information indicating a buffer size to which a logical channel or a logical channel group corresponds.

In an embodiment, reference may be made to block 101 of Embodiment 1 for particular implementation of the first transmitting unit 301, which shall not be described herein any further.

Reference may be made to Embodiment 1 for a particular format of the buffer status report, which shall not be described herein any further.

For example, the buffer size information is a field of 5 bits, or a field smaller than 5 bits, or a field larger than 6 bits, and each value of each field corresponds to a range of values of a buffer size.

In an embodiment, the buffer status report further includes an identifier of the logical channel or an identifier of the logical channel group, and reference may be made to Embodiment 1 for particular implementation thereof, which shall not be described herein any further.

An embodiment further provides a UE. As a principle of the UE for solving problems is similar to that of the method in Embodiment 1, reference may be made to the implementation of the method in Embodiment 1 for implementation of the UE, with identical contents being not going to be described herein any further.

An embodiment further provides a UE (not shown), configured with the data indication apparatus 300 as described above.

Figure 4:
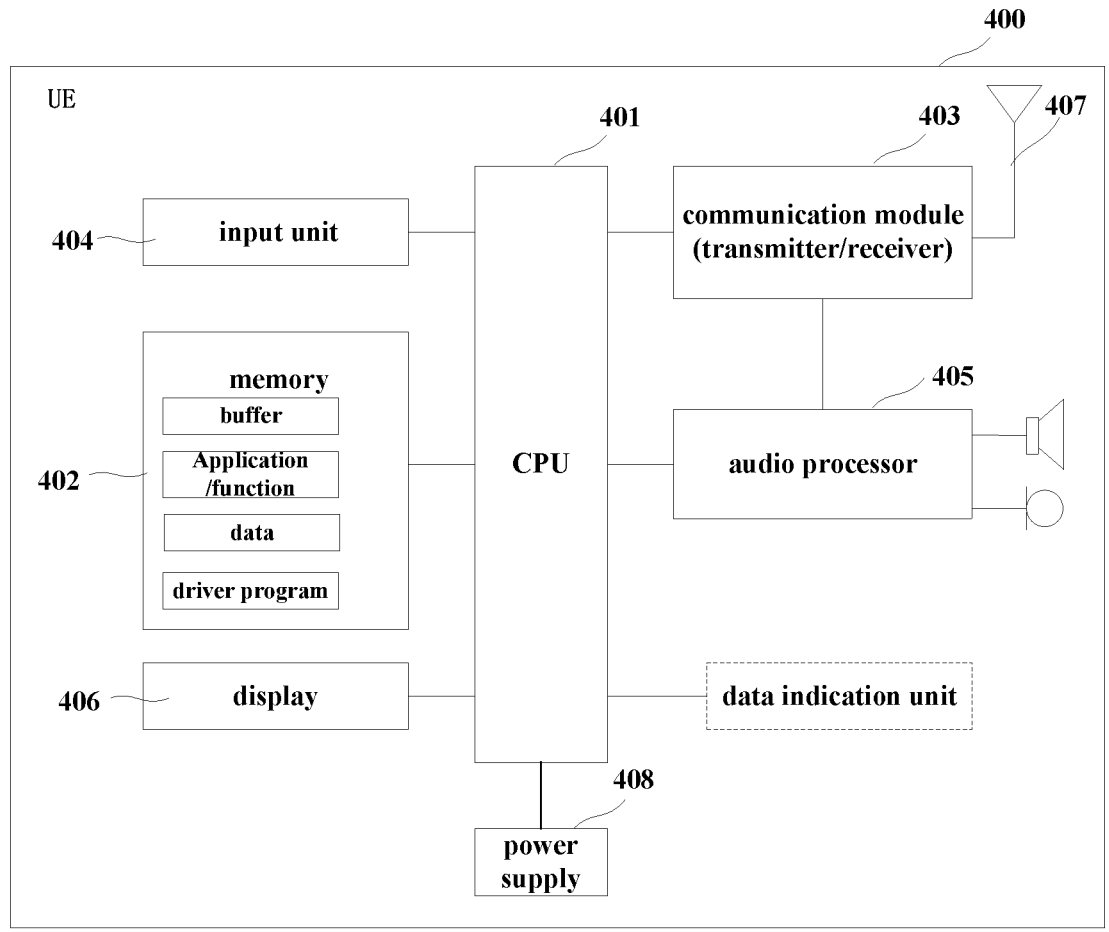

FIG. 4 is a schematic diagram of a structure of the UE of an embodiment. As shown in FIG. 4, a UE 400 may include a central processing unit (CPU) 401 and a memory 402, the memory 402 being coupled to the central processing unit 401. For example, the memory 402 may store various data, and furthermore, it may store a program for data processing, and execute the program under control of the central processing unit 401, so as to perform report transmission.

In one implementation, the functions of the apparatus 300 may be integrated into the central processing unit 401. For example, the central processing unit 401 may be configured to carry out the data indication method as described in Embodiment 1.

For example, the central processing unit 401 may be configured to: transmit a buffer status report to a network side, the buffer status report containing at least one piece of buffer size information, the buffer size information indicating a buffer size to which a logical channel or a logical channel group corresponds.

Furthermore, reference may be made to Embodiment 1 for a particular format of the buffer status report, which shall not be described herein any further.

In another implementation, the apparatus 300 and the central processing unit 401 may be configured separately. For example, the apparatus 300 may be configured as a chip connected to the central processing unit 401, such as the data indication unit shown in FIG. 4, with its functions being realized under control of the central processing unit 401.

Furthermore, as shown in FIG. 4, the UE 400 may include a communication module 403, an input unit 404, a display 406, an audio processor 405, an antenna 407, and a power supply 408, etc. For example, functions of the above components are similar to those in the related art, and shall not be described herein any further. It should be noted that the UE 400 does not necessarily include all the parts shown in FIG. 4, and furthermore, the UE 400 may include parts not shown in FIG. 4, and the related art may be referred to.

Hence, in a future communication system, the byte alignment rule may be satisfied, and it may be ensured that a length the data format of the short BSR is an integer multiple of 8 bits.

Embodiment 3

Figure 5:
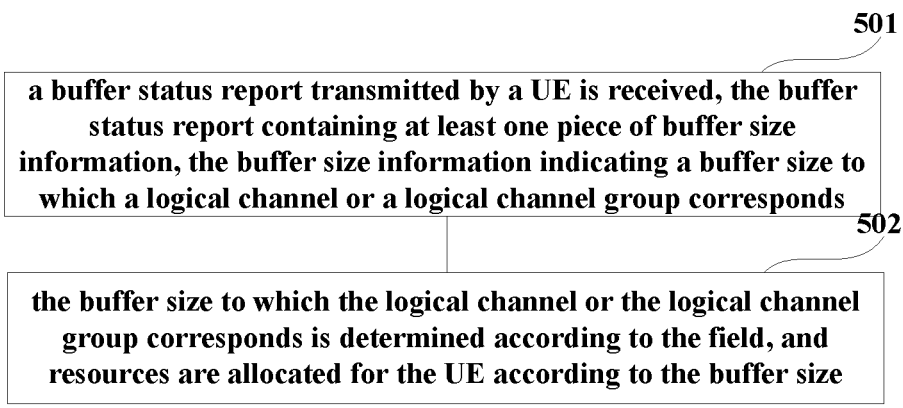

Embodiment 3 provides a data indication method. FIG. 5 is a flowchart of the data indication method of Embodiment 3. As shown in FIG. 5, the method includes:

block 501: a buffer status report transmitted by a UE is received, the buffer status report containing at least one piece of buffer size information, the buffer size information indicating a buffer size to which a logical channel or a logical channel group corresponds.

For example, reference may be made to Embodiment 1 for a particular format of the buffer status report, which shall not be described herein any further.

For example, the buffer size information is a field of 5 bits, or a field smaller than 5 bits, or a field larger than 6 bits, and each value of each field corresponds to a range of values of a buffer size.

In an embodiment, the buffer status report further includes an identifier of the logical channel or an identifier of the logical channel group, and reference may be made to Embodiment 1 for particular implementation thereof, which shall not be described herein any further.

In an embodiment, the method may further include:

block 502: the buffer size to which the logical channel or the logical channel group corresponds is determined according to the field, and resources are allocated for the UE according to the buffer size.

In block 502, as shown in FIG. 2, the network side reads the buffer size information after the logical channel or the logical channel group in the buffer status report, such as a field of 5 bits, determines the buffer size to which the logical channel or the logical channel group corresponds, that is, a size of buffer data contained by it (such as determining according to Table 1 or Table 2), and according to the buffer size, allocates appropriate resources for the UE to transmit the buffer data in the logical channel or the logical channel group. However, the particular number of allocated resources is determined according to algorithms of devices of different manufacturers, and the embodiment is not limited thereto.

Hence, in a future communication system, the byte alignment rule may be satisfied, and it may be ensured that a length the data format of the short BSR is an integer multiple of 8 bits.

Embodiment 4

Embodiment 4 provides a data indication apparatus. As a principle of the apparatus for solving problems is similar to that of the method in Embodiment 3, reference may be made to the implementation of the method in Embodiment 3 for implementation of the apparatus, with identical contents being not going to be described herein any further.

FIG. 6 is a schematic diagram of the data indication apparatus, which is applicable to a network side device. As shown in FIG. 6, a data indication apparatus 600 includes:

a first receiving unit 601 configured to receive a buffer status report transmitted by a UE, the buffer status report containing at least one piece of buffer size information, the buffer size information indicating a buffer size to which a logical channel or a logical channel group corresponds.

Reference may be made to Embodiment 1 for a particular format of the buffer status report, which shall not be described herein any further.

For example, the buffer size information is a field of 5 bits, or a field smaller than 5 bits, or a field larger than 6 bits, and each value of each field corresponds to a range of values of a buffer size.

In an embodiment, the buffer status report further includes an identifier of the logical channel or an identifier of the logical channel group, and reference may be made to Embodiment 1 for particular implementation thereof, which shall not be described herein any further.

In an embodiment, the apparatus may further include:

a first processing unit 602 configured to determine the buffer size to which the logical channel or the logical channel group corresponds according to the field, and allocate resources for the UE according to the buffer size.

In an embodiment, reference may be made to blocks 501-502 of Embodiment 3 for particular implementation of the first receiving unit 601 and the first processing unit 602, which shall not be described herein any further.

An embodiment further provides a network device. As a principle of the device for solving problems is similar to that of the method in Embodiment 3, reference may be made to the implementation of the method in Embodiment 3 for implementation of the device, with identical contents being not going to be described herein any further.

An embodiment further provides a network device (not shown), configured with the data indication apparatus 600 as described above.

Embodiment 4 further provides a network device. As a principle of the device for solving problems is similar to that of the method in Embodiment 3, reference may be made to the implementation of the method in Embodiment 3 for implementation of the network device, with identical contents being not going to be described herein any further.

FIG. 7 is a schematic diagram of a structure of the network device. As shown in FIG. 7, a network device 700 may include a central processing unit (CPU) 701 and a memory 702, the memory 702 being coupled to the central processing unit 701. For example, the memory 702 may store various data, and furthermore, it may store a program for data processing, and execute the program under control of the central processing unit 701, so as to receive a report.

In one implementation, the functions of the apparatus 600 may be integrated into the central processing unit 701. For example, the central processing unit 701 may be configured to carry out the data indication method as described in Embodiment 3.

For example, the central processing unit 701 may be configured to: receive a buffer status report transmitted by a UE, the buffer status report containing at least one piece of buffer size information, the buffer size information indicating a buffer size to which a logical channel or a logical channel group corresponds.

Reference may be made to Embodiment 1 for a particular format of the buffer status report, which shall not be described herein any further.

And furthermore, reference may be made to Embodiment 3 for a particular configuration manner of the central processing unit 701, which shall not be described herein any further.

In another implementation, the apparatus 600 and the central processing unit 701 may be configured separately. For example, the apparatus 600 may be configured as a chip connected to the central processing unit 701, such as a unit shown in FIG. 7, with its functions being realized under control of the central processing unit 701.

As shown in FIG. 7, the network device 700 may further include a transceiver 703, and an antenna 704, etc. For example, functions of the above components are similar to those in the related art, and shall not be described herein any further. It should be noted that the network device 700 does not necessarily include all the parts shown in FIG. 7, and furthermore, the network device 700 may include parts not shown in FIG. 7, and the related art may be referred to.

Hence, in a future communication system, the byte alignment rule may be satisfied, and it may be ensured that a length the data format of the short BSR is an integer multiple of 8 bits.

Embodiment 5

Embodiment 5 provides a data indication method. FIG. 8 is a flowchart of the data indication method of Embodiment 5. As shown in FIG. 8, the method includes:

block 801: a buffer status report of a variable length is transmitted to a network side; wherein, the buffer status report of a variable length contains buffer size information on a logical channel group with a buffer size being greater than zero when the buffer status report is triggered or before logical channel data are multiplexed, or contains buffer size information on a logical channel group with a buffer size being greater than zero before logical channel data are multiplexed and being equal to zero after the logical channel data are multiplexed.

In an embodiment, when a medium access control layer protocol data unit (MAC PDU) is constructed, the buffer status report may be encapsulated in a control element of the MAC PDU and transmitted to the network side.

In one implementation, before the logical channel data are multiplexed, that is, before the MAC PDU is constructed, there exist total N logical channel groups, in which buffer sizes of M logical channel groups are greater than zero, and buffer sizes of the other N-M logical channel groups are equal to zero, and the variable BSR includes buffer size information of the M logical channel groups, that is, before the MAC PDU is constructed, it is determined that the number of logical channel groups that can be contained in the buffer status report of a variable length for report is the number of all logical channel groups of buffer sizes greater than zero.

In one implementation, before the logical channel data are multiplexed, that is, before the MAC PDU is constructed, there exist total N logical channel groups, in which buffer sizes of M logical channel groups are greater than zero, and buffer sizes of the other N-M logical channel groups are equal to zero. After this time of logical channel data multiplexing, that is, after the MAC PDU is constructed, buffer data in P logical channels in the M logical channel groups are all multiplexed, that is, their buffer sizes are equal to zero. The buffer status report of a variable length contains buffer size information of P logical channels, and further contain buffer size information of M-P logical channels having buffer sizes equal to zero; where, M, N and P are positive integers greater than 0.

For example, before the logical channel data are multiplexed, that is, before the MAC PDU is constructed, buffer sizes of the logical channel groups LCG1, LCG2 and LCG3 are greater than zero, and buffer sizes of other logical channel groups are zero, and it may be determined that the buffer status report contains buffer size information of LCG1, LCG2 and LCG3. After the logical channel data are multiplexed, that is, after the MAC PDU is constructed, buffer data in LCG2 are completely multiplexed, and it buffer size is zero. And the buffer status report may still contain buffer size information of LCG2, that is, the status report may contain buffer size information of LCG1, LCG2 and LCG3.

In an embodiment, the buffer size information is a field of a predetermined number of bits, and each value corresponds to a range of values of a buffer size.

Hence, logical channel groups with buffer status being blank after data multiplexing need not to report a buffer status, and in a future communication system, complexity of processing of a transmitter end may be lowered, thereby lowering processing delay.

Embodiment 6

Embodiment 6 provides a data indication apparatus. As a principle of the apparatus for solving problems is similar to that of the method in Embodiment 5, reference may be made to the implementation of the method in Embodiment 5 for implementation of the apparatus, with identical contents being not going to be described herein any further.

Figure 9:
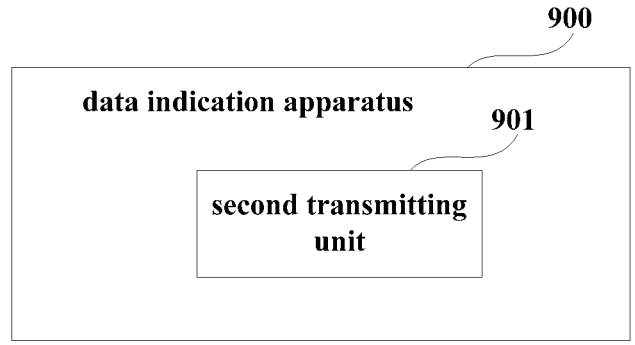

FIG. 9 is a schematic diagram of the data indication apparatus, which is applicable to a UE side. As shown in FIG. 9, a data indication apparatus 900 includes:

a second transmitting unit 901, configured to transmit a buffer status report of a variable length to a network side; wherein, the buffer status report of a variable length contains buffer size information on a logical channel group with a buffer size being greater than zero when the buffer status report is triggered or before logical channel data are multiplexed, or contains buffer size information on a logical channel group with a buffer size being greater than zero before logical channel data are multiplexed and being equal to zero after the logical channel data are multiplexed.

In an embodiment, reference may be made to block 801 of Embodiment 5 for particular implementation of the second transmitting unit 901, which shall not be described herein any further.

Reference may be made to Embodiment 5 for a particular format of the buffer status report of a viable length, which shall not be described herein any further.

An embodiment further provides a UE. As a principle of the UE for solving problems is similar to that of the method in Embodiment 5, reference may be made to the implementation of the method in Embodiment 5 for implementation of the UE, with identical contents being not going to be described herein any further.

An embodiment further provides a UE (not shown), configured with the data indication apparatus 900 as described above.

Figure 10:
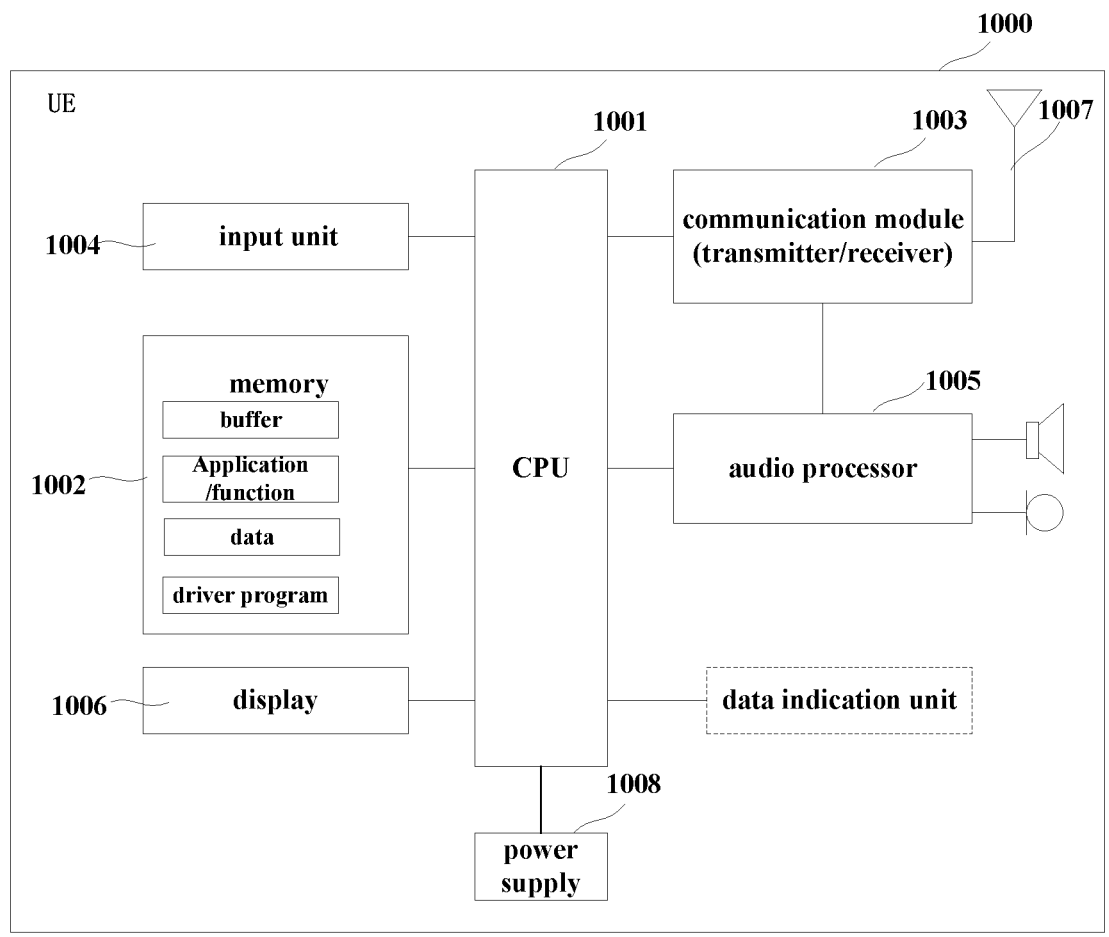

FIG. 10 is a schematic diagram of a structure of the UE of the embodiment. As shown in FIG. 10, UE 1000 may include a central processing unit (CPU) 1001 and a memory 1002, the memory 1002 being coupled to the central processing unit 1001. For example, the memory 1002 may store various data, and furthermore, it may store a program for data processing, and execute the program under control of the central processing unit 1001, so as to perform report transmission.

In one implementation, the functions of the apparatus 900 may be integrated into the central processing unit 1001. For example, the central processing unit 1001 may be configured to carry out the data indication method as described in Embodiment 3.

For example, the central processing unit 1001 may be configured to: transmit a buffer status report of a variable length to a network side; wherein, the buffer status report of a variable length contains buffer size information on a logical channel group with a buffer size being greater than zero when the buffer status report is triggered or before logical channel data are multiplexed, or contains buffer size information on a logical channel group with a buffer size being greater than zero before logical channel data are multiplexed and being equal to zero after the logical channel data are multiplexed.

Furthermore, reference may be made to Embodiment 5 for a particular format of the buffer status report, which shall not be described herein any further.

In another implementation, the apparatus 900 and the central processing unit 1001 may be configured separately. For example, the apparatus 900 may be configured as a chip connected to the central processing unit 1001, such as the data indication unit shown in FIG. 10, with its functions being realized under control of the central processing unit 1001.

Furthermore, as shown in FIG. 10, the UE 1000 may include a communication module 1003, an input unit 1004, a display 1006, an audio processor 1005, an antenna 1007, and a power supply 1008, etc. For example, functions of the above components are similar to those in the related art, and shall not be described herein any further. It should be noted that the UE 1000 does not necessarily include all the parts shown in FIG. 10, and furthermore, the UE 1000 may include parts not shown in FIG. 10, and the related art may be referred to.

Hence, logical channel groups with buffer status being blank after data multiplexing need not to report a buffer status, and in a future communication system, complexity of processing of a transmitter end may be lowered, thereby lowering processing delay.

Embodiment 7

Figure 11:
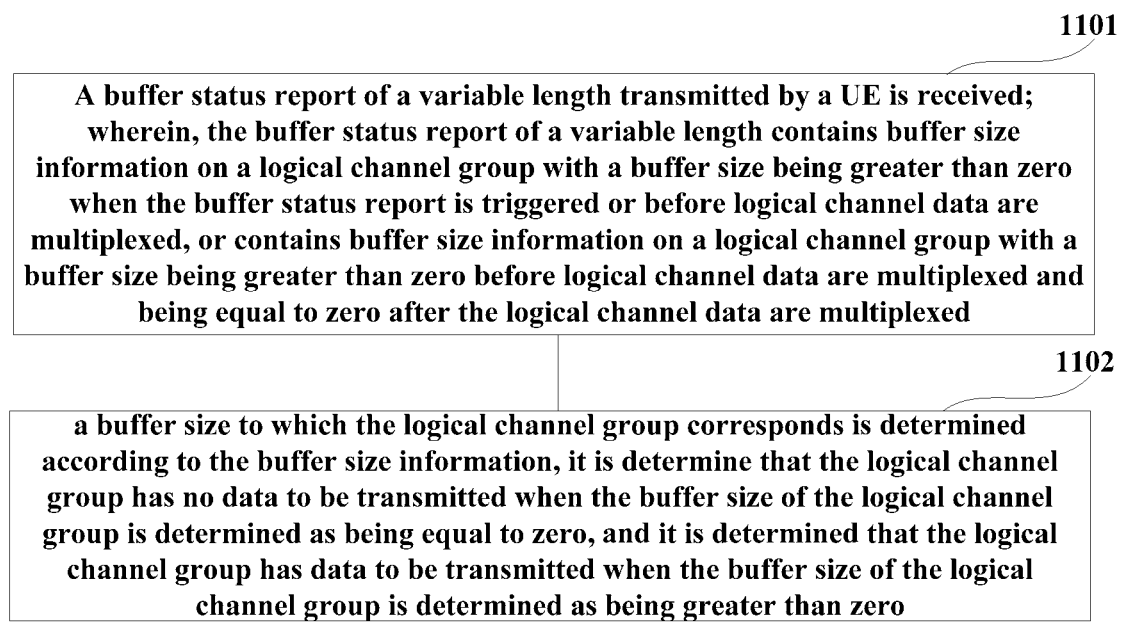

Embodiment 7 provides a data indication method. FIG. 11 is a flowchart of the data indication method of Embodiment 7. As shown in FIG. 11, the method includes:

block 1101: a buffer status report of a variable length transmitted by a UE is received; wherein, the buffer status report of a variable length contains buffer size information on a logical channel group with a buffer size being greater than zero when the buffer status report is triggered or before logical channel data are multiplexed, or contains buffer size information on a logical channel group with a buffer size being greater than zero before logical channel data are multiplexed and being equal to zero after the logical channel data are multiplexed.

In an embodiment, reference may be made to Embodiment 5 for a particular format of the buffer status report of a viable length, which shall not be described herein any further.

In an embodiment, the method may further include:

block 1102: a buffer size to which the logical channel group corresponds is determined according to the buffer size information, it is determined that the logical channel group has no data to be transmitted when the buffer size of the logical channel group is determined as being equal to zero, and it is determined that the logical channel group has data to be transmitted when the buffer size of the logical channel group is determined as being greater than zero.

In block 1102, the network side reads the buffer size information in the buffer status report, determines logical channel groups contained therein and buffer sizes to which each logical channel groups correspond. For example, when it is determined that a buffer size of a buffer channel group is equal to zero, the logical channel group is determined as having no data to be transmitted; and when it is determined that the buffer size of a buffer channel group is greater than zero, the logical channel group is determined as having data to be transmitted.

In block 1102, when it is determined that the buffer size of the logical channel group is greater than zero, the method may further include: allocating resources for the UE according to the buffer size. For example, the UE may be allocated with appropriate resources for the UE to transmit buffer data in the logical channel group. However, the particular number of allocated resources is determined according to algorithms of devices of different manufacturers, and the embodiment is not limited thereto.

For example, the variable BSR contains buffer size information of M logical channel groups; wherein, buffer sizes of the M logical channel groups are greater than zero before the logical channel data are multiplexed, that is, before the MAC PDU is constructed, and the network side allocates radio resources respectively for the M logical channel groups.

For example, the variable BSR contains buffer size information of P logical channels; wherein, buffer sizes of logical channels of the P logical channels are greater than zero before the MAC PDU is constructed, but after the MAC PDU is constructed, the buffer sizes of the logical channels are equal to zero, and the network side determines that the P logical channels have no data to be transmitted. And furthermore, the variable BSR may contain buffer size information of other Q logical channels; wherein, buffer sizes of logical channels of the Q logical channels are greater than zero before the MAC PDU is constructed, and after the MAC PDU is constructed, the buffer sizes of the logical channels are still greater than zero, and the network side allocates radio resources for the Q logical channels.

Hence, logical channel groups with buffer status being blank after data multiplexing need not to report a buffer status, and in a future communication system, complexity of processing of a transmitter end may be lowered, thereby lowering processing delay.

Embodiment 8

Embodiment 8 provides a data indication apparatus. As a principle of the apparatus for solving problems is similar to that of the method in Embodiment 7, reference may be made to the implementation of the method in Embodiment 7 for implementation of the apparatus, with identical contents being not going to be described herein any further.

FIG. 12 is a schematic diagram of the data indication apparatus, which is applicable to a network side device. As shown in FIG. 12, a data indication apparatus 1200 includes: a second receiving unit 1201 configured to receive a buffer status report of a variable length transmitted by a UE; wherein, the buffer status report of a variable length contains buffer size information on a logical channel group with a buffer size being greater than zero when the buffer status report is triggered or before logical channel data are multiplexed, or contains buffer size information on a logical channel group with a buffer size being greater than zero before logical channel data are multiplexed and being equal to zero after the logical channel data are multiplexed.

Reference may be made to Embodiment 5 for a particular format of the buffer status report of a viable length, which shall not be described herein any further.

In an embodiment, the apparatus may further include:

a second processing unit 1202 configured to determine a buffer size to which the logical channel group corresponds according to the buffer size information, determine that the logical channel group has no data to be transmitted when the buffer size of the logical channel group is determined as being equal to zero, and determine that the logical channel group has data to be transmitted when the buffer size of the logical channel group is determined as being greater than zero.

In an embodiment, when the buffer size of the logical channel group is determined as being greater than zero, the second processing unit 1202 is further configured to allocate resources for the UE according to the buffer size.

In an embodiment, reference may be made to blocks 1101-1102 of Embodiment 7 for particular implementation of the second receiving unit 1201 and the second processing unit 1202, which shall not be described herein any further.

An embodiment further provides a network device. As a principle of the device for solving problems is similar to that of the method in Embodiment 7, reference may be made to the implementation of the method in Embodiment 7 for implementation of the device, with identical contents being not going to be described herein any further.

An embodiment further provides a network device (not shown), configured with the data indication apparatus 1200 as described above.

Embodiment 8 further provides a network device. As a principle of the device for solving problems is similar to that of the method in Embodiment 7, reference may be made to the implementation of the method in Embodiment 7 for implementation of the network device, with identical contents being not going to be described herein any further.

FIG. 13 is a schematic diagram of a structure of the network device. As shown in FIG. 13, a network device 1300 may include a central processing unit (CPU) 1301 and a memory 1302, the memory 1302 being coupled to the central processing unit 1301. For example, the memory 1302 may store various data, and furthermore, it may store a program for data processing, and execute the program under control of the central processing unit 1301, so as to receive a report.

In one implementation, the functions of the apparatus 1200 may be integrated into the central processing unit 1301. For example, the central processing unit 1301 may be configured to carry out the data indication method as described in Embodiment 7.

For example, the central processing unit 1301 may be configured to: receive a buffer status report of a variable length transmitted by a UE; wherein, the buffer status report of a variable length contains buffer size information on a logical channel group with a buffer size being greater than zero when the buffer status report is triggered or before logical channel data are multiplexed, or contains buffer size information on a logical channel group with a buffer size being greater than zero before logical channel data are multiplexed and being equal to zero after the logical channel data are multiplexed.

For example, the central processing unit 1301 may be configured to: determine a buffer size to which the logical channel group corresponds according to the buffer size information, determine that the logical channel group has no data to be transmitted when the buffer size of the logical channel group is determined as being equal to zero, and determine that the logical channel group has data to be transmitted when the buffer size of the logical channel group is determined as being greater than zero. And when the buffer size of the logical channel group is determined as being greater than zero, the central processing unit 1301 may further be configured to: allocate resources for the UE according to the buffer size.

Reference may be made to Embodiment 5 for a particular format of the buffer status report, which shall not be described herein any further.

And furthermore, reference may be made to Embodiment 7 for a particular configuration manner of the central processing unit 1301, which shall not be described herein any further.

In another implementation, the apparatus 1200 and the central processing unit 1301 may be configured separately. For example, the apparatus 1200 may be configured as a chip connected to the central processing unit 1301, such as a unit shown in FIG. 13, with its functions being realized under control of the central processing unit 1301.

As shown in FIG. 13, the network device 1300 may further include a transceiver 1303, and an antenna 1304, etc. For example, functions of the above components are similar to those in the related art, and shall not be described herein any further. It should be noted that the network device 1300 does not necessarily include all the parts shown in FIG. 13, and furthermore, the network device 1300 may include parts not shown in FIG. 13, and the related art may be referred to.

Hence, logical channel groups with buffer status being blank after data multiplexing need not to report a buffer status, and in a future communication system, complexity of processing of a transmitter end may be lowered, thereby lowering processing delay.

Embodiment 9

Embodiment 9 provides a communication system.

FIG. 14 is a schematic diagram of the communication system of Embodiment 9. As shown in FIG. 14, the communication system 1400 includes a network device 1401 at a network side and a UE 1402.

For example, constitutions of the network device 1401 and the UE 1402 may be as described in embodiments 2 and 4, and workflows of the system are as described in embodiments 1 and 3, the contents of which being incorporated herein, and being not going to be described herein any further.

For example, constitutions of the network device 1401 and the UE 1402 may be as described in embodiments 6 and 8, and workflows of the system are as described in embodiments 5 and 7, the contents of which being incorporated herein, and being not going to be described herein any further.

An embodiment of the present disclosure provides a computer storage medium, including a computer readable program, which will cause a data indication apparatus or a UE to carry out the data indication method as described in Embodiment 1 or 5.

An embodiment of the present disclosure provides a computer readable program, which, when executed in a data indication apparatus or a UE, will cause the data indication apparatus or the UE to carry out the data indication method as described in Embodiment 1 or 5.

An embodiment of the present disclosure provides a computer storage medium, including a computer readable program, which will cause a data indication apparatus or a network device to carry out the data indication method as described in Embodiment 3 or 7.

An embodiment of the present disclosure provides a computer readable program, which, when executed in a data indication apparatus or a network device, will cause the data indication apparatus or the network device to carry out the data indication method as described in Embodiment 3 or 7.

The above apparatuses of the present disclosure may be implemented by hardware, or by hardware in combination with software. The present disclosure relates to such a computer-readable program that when the program is executed by a logic device, the logic device is enabled to carry out the apparatus or components as described above, or to carry out the methods or steps as described above. The present disclosure also relates to a storage medium for storing the above program, such as a hard disk, a floppy disk, a CD, a DVD, and a flash memory.

The method/apparatus described with reference to the embodiments of this disclosure may be directly embodied as hardware, software modules executed by a processor, or a combination thereof. For example, one or more functional block diagrams and/or one or more combinations of the functional block diagrams shown in FIGS. 3, 4, 6, 7, 9, 10 and 12-14 may either correspond to software modules of procedures of a computer program, or correspond to hardware modules. Such software modules may respectively correspond to the steps shown in FIGS. 1, 5, 8 and 11. And the hardware module, for example, may be carried out by firming the soft modules by using a field programmable gate array (FPGA).

The soft modules may be located in an RAM, a flash memory, an ROM, an EPROM, and an EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in FIGS. 3, 4, 6, 7, 9, 10 and 12-14 may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in FIGS. 6-11 may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

What is claimed is:

1. A terminal, comprising:
a memory that stores a plurality of instructions; and
a processor coupled to the memory and configured to execute the instructions to:
multiplex logical channel data of a logical channel group (LCG); and
a transmitter configured to
transmit a buffer status report (BSR) of a variable length to a network side, wherein the BSR of a variable length contains buffer size information, wherein the buffer size information indicates a first buffer size of the LCG after the logical channel data of the LCG are multiplexed, wherein the LCG has a second buffer size being greater than zero before the logical channel data of the LCG are multiplexed, and wherein the first buffer size is zero,
wherein the BSR is configured for receipt by a network device to indicate to the network device the first buffer size of the LCG according to the buffer size information.

2. A communication system, comprising:
a terminal configured to:
multiplex logical channel data of a logical channel group (LCG),
transmit a buffer status report (BSR) of a variable length, wherein the BSR contains buffer size information, wherein the buffer size information indicates a first buffer size of the LCG after the logical channel data of the LGC are multiplexed, wherein the LCG has a second buffer size greater than zero before the logical channel data are multiplexed, and wherein the first buffer size is zero, and
transmit buffer size information corresponding to the first buffer size of the LGC; and
a network device configured to receive the BSR, and to indicate to the network device the first buffer size of the LCG according to the buffer size information.

* * * * *

(12) SUPPLEMENTAL EXAMINATION CERTIFICATE

United States Patent
Shi et al.

(10) Number: US 11,277,766 F1
(45) Certificate Issued: May 10, 2022

Control No.: 96/000,397

Filing Date: Apr. 27, 2022

Primary Examiner: Ovidio Escalante

No substantial new question of patentability is raised in the request for supplemental examination. See the Reasons for Substantial New Question of Patentability Determination in the file of this proceeding.

(56) Items of Information

U.S. PATENT DOCUMENTS

| | | |
|---|---|---|
| 2013/016615 | 01/2013 | Shi et al. |

OTHER DOCUMENTS

Vice-Chairwoman (INTERDIGITAL), "Report from NR UP and LTE Break-Out Session (FeD2D, sTTi, Rel-14 corretions)." Agenda Item: 13.1.2, 3GPP TSG-RAN WG2 Meeting #98, R2-1704030, Hangzhou, China, May 15-19, 2017.